May 26, 1959  E. T. HERMANN  2,888,254
HIGH TEMPERATURE CONTINUOUS PROCESS FURNACE
Filed July 5, 1955  3 Sheets-Sheet 1

INVENTOR.
ERNEST T. HERMANN
BY
ATTORNEY

May 26, 1959      E. T. HERMANN      2,888,254
HIGH TEMPERATURE CONTINUOUS PROCESS FURNACE
Filed July 5, 1955      3 Sheets-Sheet 2

INVENTOR.
ERNEST T. HERMANN
BY
ATTORNEY

May 26, 1959 E. T. HERMANN 2,888,254
HIGH TEMPERATURE CONTINUOUS PROCESS FURNACE
Filed July 5, 1955 3 Sheets-Sheet 3
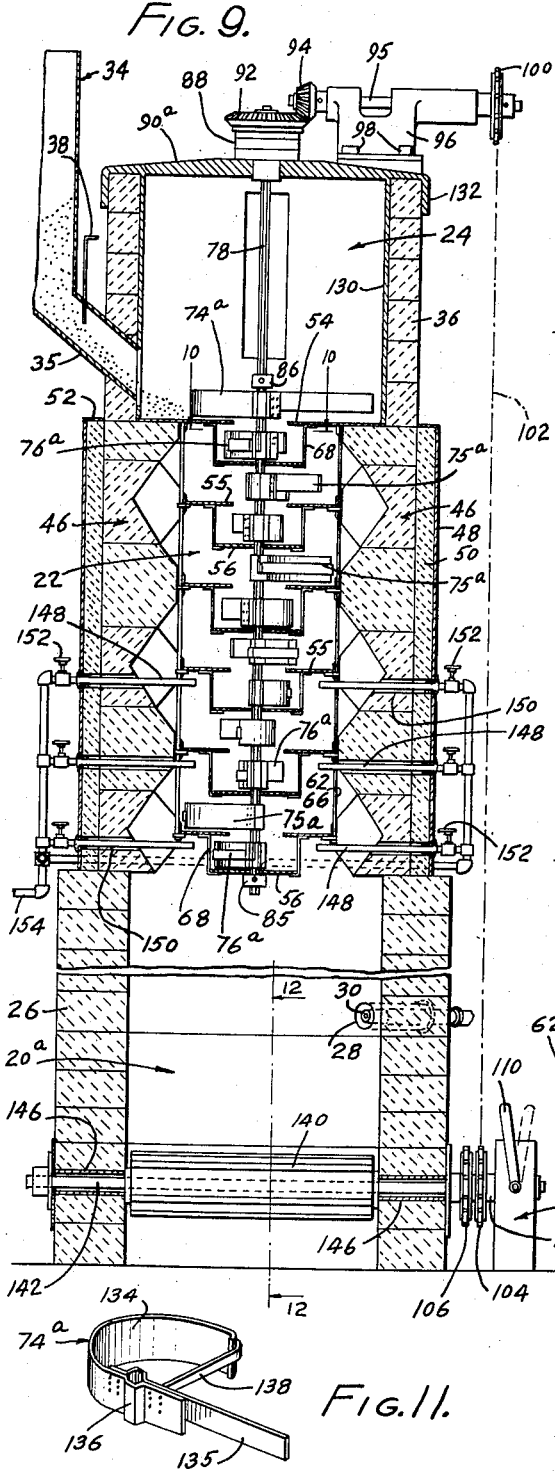
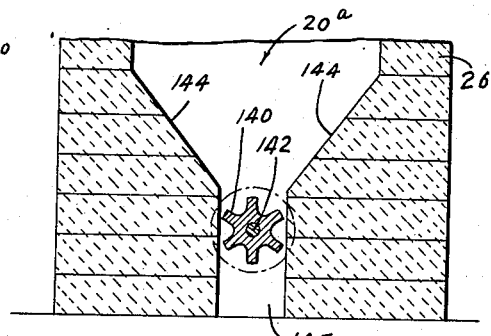
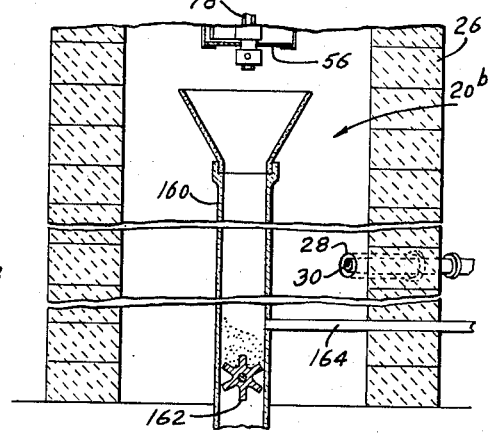
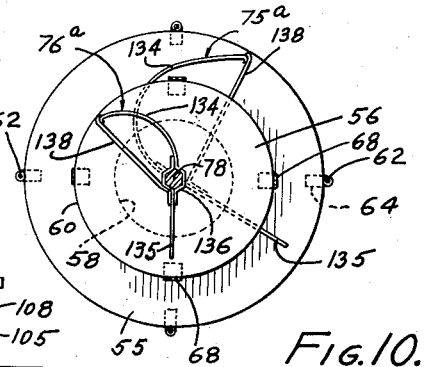
INVENTOR.
ERNEST T. HERMANN
BY
ATTORNEY

2,888,254

HIGH TEMPERATURE CONTINUOUS PROCESS FURNACE

Ernest T. Hermann, El Segundo, Calif., assignor, by mesne assignments, of forty-four percent to said Ernest T. Hermann, as trustee Application July 5, 1955, Serial No. 519,689

18 Claims. (Cl. 263—26)

This invention relates to a high temperature furnace, kiln or retort in which divided material progresses gravitationally by stages through and in intimate contact with a rising stream of highly heated gaseous fluid for such purposes as roasting, oxidizing, reducing, vaporizing, and vitrifying the divided material or constituents thereof. The invention pertains in general to the construction of such a furnace with provision for maintaining a selected atmosphere therein as may be desired, and/or with provision for introducing fluids as may be required for various purposes, including the purpose of inducing chemical reactions in the furnace.

A general object of the invention is to provide a furnace construction having a series of hearths at successive levels with provision for moving the divided material downward from one hearth to another in a manner conducive to an exceedingly high rate of heat transfer to the material. For this purpose it is contemplated that the hearths will be mounted in staggered relationship with a discharge edge of one hearth overhanging a receiving area of the next lower hearth, and that a suitable scraper means will be provided for each hearth to shift the divided material thereon to the discharge edge. Such an arrangement of staggered hearths and cooperating scraper means must be of open construction for the free upward passage of the heated gaseous fluid therethrough and, in addition, highly turbulent flow of the heated fluid is required for optimum results.

This object is attained by a series of hearths in a furnace chamber of upright cylindrical configuration in which annular or ring-shaped hearth members having inner-circumferential discharge edges alternate with co-axial disc-shaped hearth members having outer-circumferential discharge edges, the diameter of the disc members being intermediate the inner and outer diameters of the annular members. The annular hearth members span the furnace chamber, and the chamber wall has numerous recesses around the periphery of each annular hearth member so that the upward flowing heated gaseous fluid may pass both through and around each annular hearth member. In this regard, a feature of the preferred practice of the invention is that the chamber wall recesses have inclined surfaces to deflect the heated gaseous fluid radially inward from all sides at each hearth level for violent local turbulence to favor rapid heat transfer to the downwardly moving divided material.

The invention is further directed to the problem of providing the desired cooperative relationship between the hearths and the associated scrapers under conditions of extremely high temperature operation, and to do so without difficulty at lower temperatures. This problem is troublesome, first, because thermal expansion and contraction of the supporting structures of the hearths and scrapers, respectively tend to vary the positions of the scrapers relative to the hearths, and, second, because it is only too easy for the supporting structures to warp at high temperature. This problem is especially troublesome if it is further desired to make the hearths and scrapers readily removable from the furnace chamber for such purposes as cleaning, repair, and replacement.

The invention meets this problem by providing two separate assemblies removably supported from the above in the furnace chamber. One assembly, which may be termed a stationary assembly comprises the series of hearths and a stationary supporting structure therefor; the other assembly, which may be termed an actuated assembly, comprises the series of scrapers and an actuated support structure therefor. In the preferred practice of the invention the actuated support structure is a vertical shaft extending co-axially through the series of hearths.

Since both of these assemblies are suspended from above, both extend and contract in the same general manner in response to changes in temperature, all of the hearths and scrapers shifting downward in response to rising temperature and vice versa. In such an arrangement, each hearth and each scraper has a range of thermally induced vertical movement, which depends upon the thermal coefficient of expansion of the associated support structure, and the distance of the hearth or scraper from the supension point. The range of thermal movement of each scraper must be such as to avoid binding of the scraper by pressure contact with the hearth.

In accord with the teaching of the invention, such binding action is avoided either by equalizing the ranges of movement of the scrapers with the ranges of movement of the associated hearths, or by causing the scrapers to have larger ranges of thermal movement than the hearths with the "hot" positions of the hearths immediately adjacent to the lower limits of the ranges of thermal movement of the corresponding scraper members. If the ranges are equalized, the position of each scraper relative to the corresponding hearth will be constant, regardless of how low or how high the temperature in the furnace chamber. In the second arrangement, however, with the thermal range of movement of the scrapers exceeding the ranges of movement of the hearths, the scrapers are at optimum spacing from the corresponding hearths at the normal high operating temperature of the furnace and retract upward from optimum spacing when the furnace is cold.

If equalization of the ranges of thermal movement is desired, the two support structures must have the same co-efficient of thermal expansion, and in the absence of some compensating provision must be suspended from the same support level. As will be explained, such compensation may be provided, if desired, where the actuated structure that supports the scrapers is longer than the stationary support structure for the hearths, and is suspended from a higher support level.

In the preferred practice of the invention both the stationary assembly and the actuating assembly are removably mounted inside the upright furnace chamber so that each may be lifted out of the furnace as a unit when desired. In this regard a feature of the invention is that when either of the two assemblies is lifted out of the furnace it interlocks with the other assembly so that both assemblies are lifted out together.

The problem of maintaining correct positioning of the parts including alignment of the actuated assembly is accomplished by arranging for the walls of the furnace chamber to confine the fixed assembly in a self-aligning manner, and by further arranging for the fixed assembly to confine the actuated assembly at spaced levels.

The above and other objects of the invention, including objects pertaining to the maintenance of the desired atmospheres in the furnace and the introduction of desired fluids, will be understood from the following detailed description, considered with the accompanying drawings.

In the drawings, which are to be regarded as merely illustrative:

Fig. 9 is a vertical sectional view of a second embodiment of the invention;

Fig. 10 is a fragmentary section on an anlarged scale taken as indicated by the line 10—10 of Fig. 9 showing the positional relationship of the scrapers to the hearths;

Fig. 11 is a perspective view of a scraper and an associated spreader of Fig. 10;

Fig. 12 is a fragmentary vertical sectional view taken as indicated by the line 12—12 of Fig. 9; and Fig. 13 is a sectional view similar to Fig. 12 illustrating a modification of the invention.

Figures 1, 2, 7, 8:
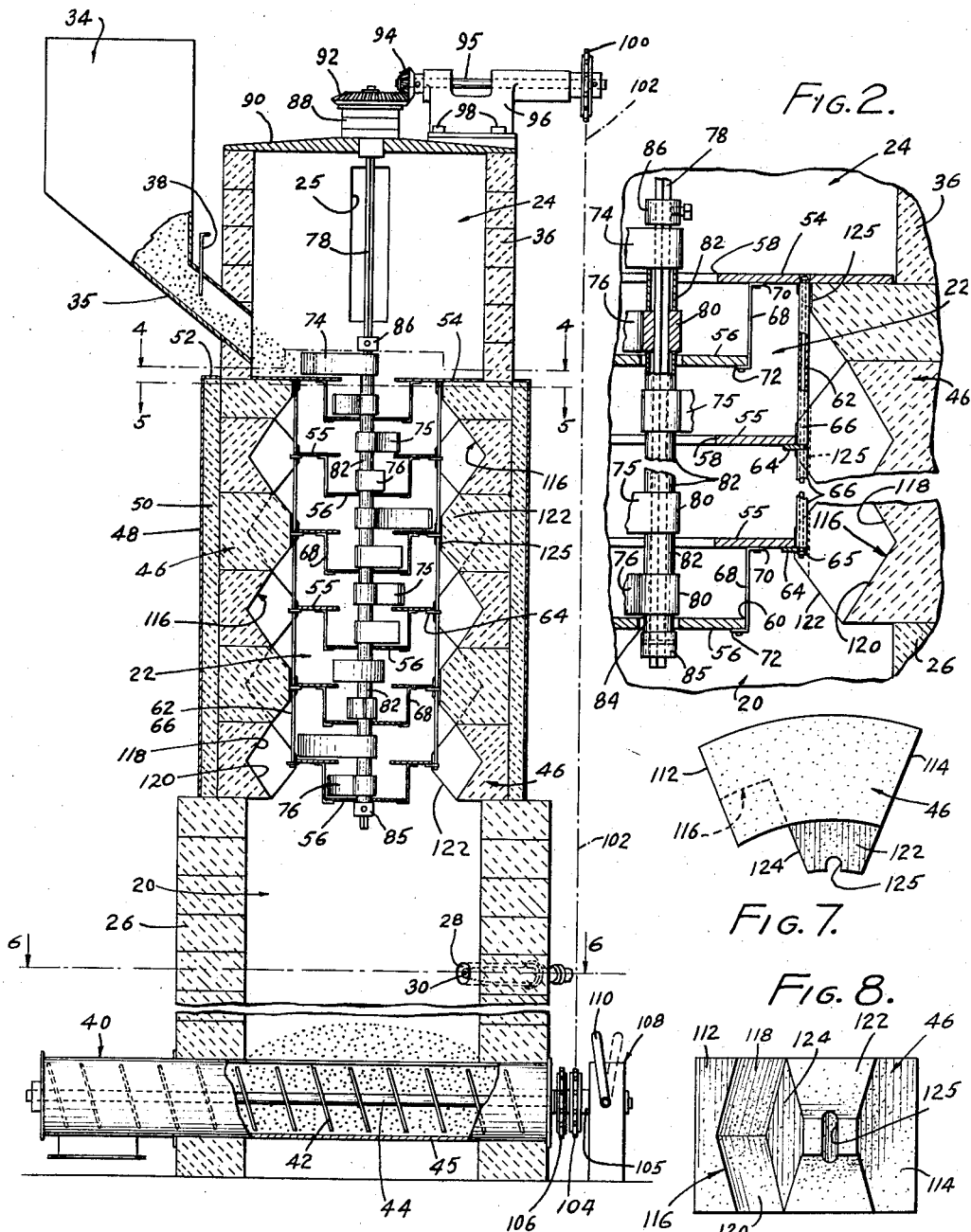
Fig. 1 is a vertical sectional view of a selected embodiment of the invention.
Fig. 2 is a fragmentary detail of Fig. 1 on an enlarged scale with parts broken away to reveal the structure.
Fig. 7 is a plan view of a refractory brick that is utilized in the construction of the furnace wall in the first embodiment of the invention.
Fig. 8 is an elevational view of the same brick.
Figure 3:
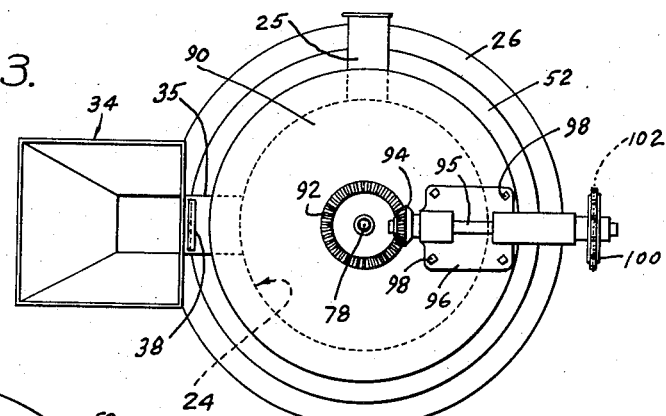
Fig. 3 is a top plan view of the first embodiment of the invention.

Fig. 1 illustrating a selected embodiment of invention shows a furnace largely constructed of refractory brick, which furnace has a lower combustion compartment 20, an intermediate heat-exchange compartment 22, and an upper compartment 24 having at least one peripheral exhaust port 25 for discharge of the hot gases. In some instances, the hot gases will be released to the atmosphere, usually after passing through a cyclone separator; in other instances the hot gases will be passed through a suitable condenser for the recovery of vapors, for example, in the processing of oil shales.

Figure 6:
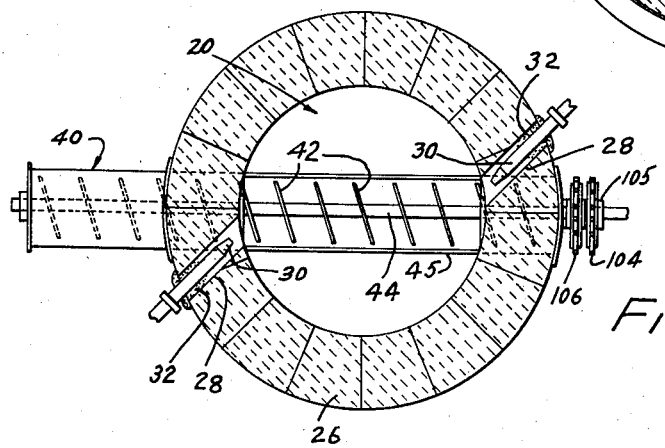
Fig. 6 is a transverse section taken as indicated by the line 6—6 of Fig. 1.

As shown in Figs. 1 and 6, the wall 26 of the lower combustion compartment 20 has two opposite passages 28 in which fuel burner nozzles 30 are mounted and sealed by suitable material 32. These nozzles are connected to a suitable source of fluid fuel under pressure and are angularly directed to produce a vortex for rapid and efficient combustion.

Divided material such as crushed ore or the like is fed to the furnace at a suitable rate by an upper feed-hopper 34 which has an inclined discharge spout 35 extending through the wall 36 of the upper compartment 24. An adjustable gate 38 makes it possible to regulate the rate of feed, it being contemplated that the divided material banked behind the gate will serve as an effective seal against the escape of hot gases through the supply hopper.

After the divided material under process passes through the heat-exchange compartment 22, it drops into the bottom of the combustion compartment 20 for removal by a screw conveyor 40 comprising a helical blade 42 on a shaft 44 journaled in a cylindrical housing 45. The screw conveyor 40 is operated in such manner that sufficient accumulation of the divided material is present in the conveyor at all times to serve as a seal against the escape of the hot gases therethrough.

The wall of the heat-exchange chamber 22 is made of refractory bricks 46 of special configuration. In the construction shown, the bricks are surrounded by an outer cylindrical metal casing 48, with a mass of heat resistant sealing material 50 interposed between the refractory bricks and the metal casing. The sealing material 50 may be diatomaceous earth, for example. A metal ring 52 is united with the metal casing to close the space confining this sealing material.

The furnace is provided with a series of hearths at spaced levels throughout the heat-exchange compartment 22, the series of hearths comprising annular or ring-shaped hearth members and disc-shaped hearth members at alternate levels. The annular hearths comprise an uppermost annular hearth member 54 of relatively large diameter on the annular floor of the upper furnace compartment 24 and a series of annular hearth members 55 at successively lower levels. The disc-shaped hearth members 56 are at the alternate level, there being a disc-shaped hearth member below each annular hearth member.

Figure 4:
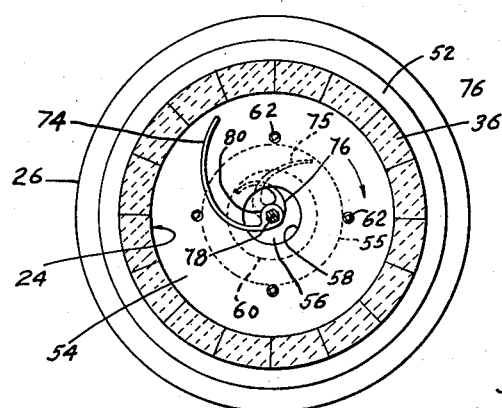
Fig. 4 is a transverse section taken as indicated by the line 4—4 of Fig. 1.

It can be seen that this arrangement provides a staggered series of hearths since the diameter of the disc members 56 is intermediate the outside and inside diameter of the annular members 54 and 55. Thus each annular hearth member has an inner circumferential discharge edge 58 (Fig. 4) that overhangs a receiving area of the next lower disc-shaped hearth member 56 and each disc-shaped hearth member has an outer circumferential discharge edge 60 (Fig. 5) that overhangs a receiving area on the next lower annular hearth member.

The various hearth members are combined with a suitable stationary support structure to form what may be termed a stationary assembly. In the present construction the uppermost annular hearth member 54 engages or rests on the floor of the upper furnace compartment 24 for the purpose of suspending this stationary assembly in the heat-exchange compartment 22. For this purpose four tension rods 62 may extend downward from the annular hearth member 54 in the manner shown in Fig. 2, these tension rods being at equal circumferential spacing around the inner wall of the heat-exchange compartment. Mounted on each of the four tension rods 62 is a series of metal tabs 64, there being one such metal tab in supporting engagement with the underside of each of the annular hearth members 55. The lowermost metal tab 64 is secured by a nut 65 at the end of the tension rod and the remaining metal tabs are held in place by a series of tubular spacers 66.

Figure 5:
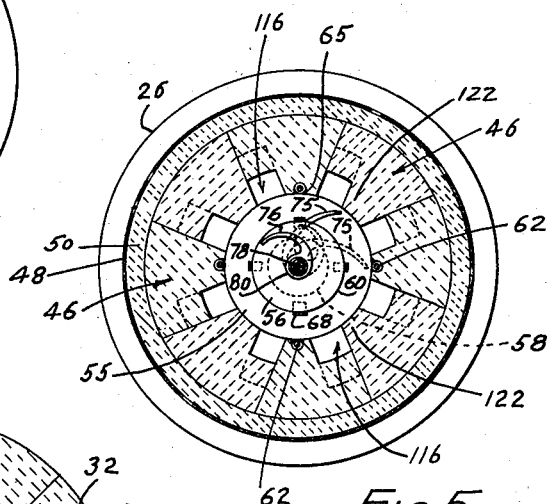
Fig. 5 is a transverse section taken as indicated by the line 5—5 of Fig. 1.

Each of the disc-shaped hearth members 56 may be suspended from the annular hearth member at the next higher level by means of four hangers 68 (Fig. 5). As shown in Fig. 2, each of these hangers 68 may be a metal strap formed with a flange 70 at its upper end for attachment to the annular hearth member and formed with a similar flange 72 at its lower end for attachment to the underside of the disc-shaped hearth member.

The scrapers that correspond to the various hearth members for cooperation therewith comprise an uppermost scraper 74 of relatively large radial dimension for cooperation with the uppermost annular hearth member 54, a series of similar scrapers 75 of lesser radial extent for cooperation with the annular hearth members 55, respectively, and a series of scrapers 76 for cooperation respectively with the disc-shaped hearth members 56. All of these scrapers are combined with a suitable actuated support structure to form what may be termed an actuated assembly. In this instance the actuated support structure comprises a vertical shaft 78 which is preferably of hexagonal cross-sectional configuration.

Each of the scrapers in this embodiment of the invention comprises a casting formed with a hexagonal sleeve 80 at its inner end to embrace the hexagonal shaft 78. Thus for each scraper there is a choice of six angular positions spaced 60° apart. The various scrapers are spaced apart vertically by interposed spacer sleeves 82, with the lowermost scraper supported by a short spacer sleeve 84. This series of scrapers and spacer sleeves is confined between a lower collar 85 and an upper collar 86, each of which is fixedly mounted on the hexagonal shaft.

The hexagonal shaft 78 may be rotatably suspended in the furnace in any suitable manner. In this instance, the hexagonal shaft is suspended by a suitable thrust bearing 88 carried by a heavy plate 90 that serves as a removable cap or cover for the furnace.

The hexagonal shaft 78 together with the discharge conveyor 40 may be actuated in any suitable manner. For this purpose a bevel gear 92 on the upper end of the shaft 78 above the cap plate 90 is shown in mesh with a second bevel gear 94 on a short countershaft 95. The countershaft 95 is journaled in a suitable bracket casting 96 that is anchored to the top plate 90 by suitable screws 98. The outer end of the countershaft 95 carries a sprocket 100 which is connected by a sprocket chain 102 with a second lower sprocket 104. This lower sprocket 104 is keyed to a sleeve 105 that is rotatably mounted on the conveyor shaft 45. The sleeve 105 also carries a sprocket 106 by means of which the sleeve may be actuated by a suitable prime mover (not shown). A suitable clutch 108 having a control handle 110 serves to connect the conveyor shaft 45 to the sleeve 105 for actuation thereby as desired.

All of the scrapers that cooperate with the annular hearth members are or what may be termed concave configuration in the sense that the leading faces of these scrapers as viewed in plan are concave, each of the scrapers being curved forward with respect to the direction of rotation. Thus in Fig. 4, with the hexagonal shaft 78 rotating clockwise as indicated by the arrow, the uppermost scraper 74 curves forwardly and thus tends to cause divided material in the path of the scraper to be shifted inwardly to the inner circumferential discharge edge 58 of the annular hearth member 54. The remaining scrapers 75 that are associated with the remaining annular hearth members 55 are of similar configuration to function in the same manner.

Each of the scrapers 76 that cooperate with a disc-shaped hearth member 56 is of what may be termed convex configuration in that the leading face of the scraper as viewed in plan is convex with respect to the direction of rotation of the hexagonal shaft 78. Thus each of the scrapers 76 is swept backward with respect to the direction of rotation as may be seen in Fig. 5. It is apparent that each of the convex scrapers 76 will shift the divided material on the corresponding disc-shaped hearth 56 outward towards the outer circumferential discharge edge 60 of the hearth member.

The various scrapers of the series of scrapers are so arranged that each scraper shifts the divided material to the discharge edge of the corresponding hearth member in such manner that the divided material pours in a stream to fall on the receiving area of the next lower hearth member immediately behind the scraper on the lower level. Thus the material poured onto each of the hearths remains thereon throughout the major portion of one complete rotation of the hexagonal shaft 80.

It is contemplated that the refractory wall of the heat-exchange chamber 22 will be formed with suitable recesses for passing a portion of the heated gases around the periphery of each of the annular hearth members 55. For this purpose each of the refractory bricks 46 making up the inner wall of the heat exchange chamber 22 may be of the configuration shown in Figs. 7 and 8.

Each of the refractory bricks 46 has two radial side faces 112 and 114. The inner circumferential face of the brick has a recess 116 that opens on the radial side face 112, this recess having two inclined convergent surfaces 118 and 120. Adjacent the recess 116 the inner circumferential face of the brick is formed with a projection 122, one side of which is a continuation of the radial side face 114 of the brick. The other side face 124 of the projection 122 is continuous with the inner recess 116. The projection 122 is of the tapered or beveled configuration shown and preferably has a vertical groove 125 formed therein.

The vertical grooves 125 serve as guides to maintain the fixed assembly of hearth members in vertical alignment. For this purpose the tubular spacers 66 on the tension rods 62 extend in a loose sliding manner into the vertical grooves 125. Thus each of the vertical grooves 125 may be considered as providing two opposite guide surfaces for confining the tubular spacers 66 from opposite sides thereof. As may be seen in Fig. 1 the inward projections 122 of the refractory brick 46 are positioned at the various levels of the annular hearth members 55 so that the recesses 116 of the brick provide the desired passages for flow of the hot gases around the outer margins of the annular hearth members.

The manner in which the described apparatus functions for its purpose may be readily understood from the foregoing description. For those operations in which it is desirable to keep the furnace sealed at all times, enough of the divided material is maintained in the feed hopper 34 to prevent the escape of gases therethrough and, in like manner, enough material is maintained in the discharge conveyor 40 to keep the gases from escaping therethrough. In starting a continuous operation, the clutch 108 is disengaged for a suitable initial time interval to permit the required accumulation of the processed material at the bottom of the furnace and, if necessary, the clutch is periodically disengaged during normal operation to make sure that the conveyor is continuously filled with the processed material.

The unprocessed divided material is discharged by the supply hopper 35 onto the uppermost annular hearth member 54. The uppermost scraper 74 functions to shift the initially deposited material to the inner circumferential pouring edge 58 of the annular hearth member, and thus causes the material to drop on to the next lower disc-shaped hearth member 56 immediately behind the next lower scraper 76. This scraper 76 shifts the deposited material to the outer circumferential discharge edge 60 of the disc-shaped hearth member to cause the material to pour on to the next lower annular hearth member 55 immediately behind the corresponding scraper 75.

In this manner the divided material progresses by stages, periodically pausing in a thin layer on a hearth member and periodically dropping in a thin stream from one hearth member to another. The high temperature gases sweeping upward through the heat-exchange compartment 22 are thrown into violent turbulence both by the baffle effect of the hearth members and by the converging effect of the numerous inclined surfaces provided by the bricks 46 of the heat-exchange compartment wall.

It is apparent that the numerous beveled projections 122 surrounding each of the annular hearth members 55 tend to divert the upwardly streaming gases inwardly under the annular baffle member towards its central opening and that simultaneously the numerous recesses 116 extending around the periphery of the annular baffle member direct numerous streams of the hot gases inward over the upper surface of the annular baffle member. With counter flow of the finely divided material downward against the upwardly flowing high temperature gases and with the hot gases flowing with violent turbulence, heat transfer to the divided material occurs in an extremely rapid manner.

It has been found that the furnace will operate in a highly efficient manner and with complete satisfaction with considerable variation in the configurations in the dimensions and in the spacing of the various components in the heat-exchange compartment 22. In one successful construction, the area of the central opening in each of the annular hearth members 55 was approximately $\frac{1}{7}$ of the total area of the hearth member and the total area of the annular hearth member equaled the total of the cross sectional areas of the adjacent peripheral passages or recesses 116. In the same construction the area of each of the disc-shaped hearth members was approximately half the area of the corresponding annular hearth member 55 and the distance of each disc-shaped hearth member 55 downward from the corresponding annular hearth member 55 was approximately one-third of the outside diameter of the annular hearth member.

Both the fixed assembly and the actuated assembly are made of materials capable of withstanding the high temperatures involved and for this purpose the various hearth members may be made of refractory materials such as Carborundum. Since both of these assemblies are suspended from above, only a minor lower portion of each assembly is in the region of maximum temperature. The upper portion of each of the two assemblies where the stresses are maximum is in the cooler region of the furnace.

In initiating operation from a cold start, it is apparent that each of the two assemblies expands longitudinally downward from the level at which it is suspended. This downward thermal expansion must be taken into consideration in the positioning of the various scrapers on the shaft 78 so that the scrapers will be properly positioned relative to the corresponding hearths under normal high temperature operating conditions. It is apparent that each hearth member shifts downward in response to thermal expansion in accord with the thermal coefficient of expansion of the fixed support structure and also in accord with the distance of the hearth member from the suspension level, i.e., from the level of the uppermost annular hearth member 54. In like manner it is apparent that each of the scrapers shifts downward in response to thermal expansion in accord with the thermal coefficient of expansion of the shaft structure and also in accord with the distance of the scraper from the suspension level, i.e., from the level of the thrust bearing 88.

In the first embodiment of the invention, both the fixed assembly and the actuated assembly have the same coefficient of thermal expansion but the actuated assembly is longer than the fixed assembly and is suspended from a higher level. Thus the distance of each of the scrapers from the suspension point or level of the hexagonal shaft 78 is greater than the distance of the corresponding hearth member from the suspension points or level of the four tension rods 62. It is apparent therefore that each of the scrapers in shifting downward from a cold position to a hot position will shift over a greater range than the corresponding hearth member.

The problem is to keep thermal expansion of the two assemblies from causing the scrapers to bind on the corresponding hearth members and this problem is solved by arranging for the hot position of each of the hearth members to be adjacent to the lower end of the range of thermal movement of the corresponding scraper. Thus the scrapers at their cold positions are spaced appreciably above the cold positions of the corresponding hearth members, but the scrapers move into the desired close spacing relative to the corresponding hearths when the furnace is raised in temperature to its normal operating temperature.

The second embodiment of the invention shown in Figs. 9 to 12 is largely identical with the construction heretofore described, as indicated by the use of corresponding reference numerals to indicate corresponding parts.

One feature of this second embodiment is the inclusion of a metal cylinder 130 as a liner for the upper furnace compartment 24, the primary purpose of which is to serve as a support member under compression to carry the weight of the metal cap or cover 90a so that thermal expansion of the cylindrical member 130 will correspondingly raise the cap 90a. Preferably the cap 90a has a peripheral skirt 132 that slidingly embraces the furnace wall 36 to prevent lateral displacement of the cap. The advantage of this arrangement is that the thermal expansion of the metal cylinder 130 may compensate at least in part for the thermal expansion of the hexagonal shaft 78 in the region between the annular hearth member 54 and the thrust bearing 88 from which the shaft is suspended.

Preferably the fixed assembly, the actuated assembly, and the metal cylinder 130 all have substantially the same coefficient of thermal expansion so that the metal cylinder fully compensates for thermal expansion of the hexagonal shaft 78 above the suspension point or level of the fixed assembly. Thus the portion of the hexagonal shaft at the level of the uppermost hearth member 54 remains substantially constant in level throughout the temperature range extending from a cold start to the high normal temperature for continuous operation.

In effect the suspension point or level of the hexagonal shaft is brought down to the suspension level of the fixed assembly and it may be said that the effective suspension points of both assemblies are at the same level. The advantage of this arrangement is that the downward thermal movement of each hearth member is substantially equalized with the downward thermal movement of the corresponding scraper so that the scrapers and hearth members may be adjusted at close spacing relative to each other when the furnace is cold, with the insurance that the adjustment will be maintained throughout the subsequent rise in temperature to the normal operating temperature.

Another feature of this second embodiment of the invention is that each of the scrapers 74a, 75a, and 76a is of sheet metal construction, as best shown in Fig. 12 which illustrates the construction of scraper 74a. A curved metal strip 134 which forms the scraper proper is riveted to a bar 135 which serves as a spreader, the lower edge of the bar 135 being spaced above the lower edge of the metal strip 134. The metal strip and bar are each offset to form a hexagonal sleeve 136 by means of which the scraper is mounted on the hexagonal shaft 78. A third narrow strip of metal 138 positioned at a higher level than the spreader bar 135 serves as a brace to maintain the desired curved configuration of the metal strip 134.

The divided material is poured onto each hearth rearward of the corresponding curved scraper but in front of the corresponding spreader bar 135. Thus one portion of the deposited material is exposed to the hot gases and then the spreader bar disturbs the deposited material to expose another portion before the curved scraper displaces the deposited material to the discharge edge of the hearth member.

This second embodiment of the invention has a ribbed roller 140 on a shaft 142 to serve the purpose of the previously described screw conveyor 40. As shown in Fig. 11 the combustion compartment 20a has two opposite inclined bottom walls 144 which converge to form a restricted discharge passage 145 in which the ribbed roller 140 is mounted. The shaft 142 is journaled in suitable bearing sleeves 146 and is actuated in the same manner as heretofore described. It is apparent that rotation of the ribbed roller 140 will discharge increments of the processed material and that the ribbed roller may be operated with a continuous accumulation of the processed material on its upward side to maintain the desired seal against the downward escape of the heated gases.

A special feature of the construction shown in Fig. 9 is the inclusion of numerous nozzles 148 for introducing fluid at various levels in the heat exchange compartment 22, these nozzles extending through corresponding radial bores 150 in the furnace wall and being sealed in the bores. The nozzles 148, which are individually controlled by adjustable valves 152, are connected to a supply pipe 154 from a suitable fluid source. The fluid introduced by the nozzles 148 may be a liquid fluid, for example petroleum or other hydrocarbon or may be a gaseous fluid such as air or oxygen. A hydrocarbon may be introduced, for example, to carry out a reduction process. Thus a metal oxide introduced by the feed hopper 34 may be reduced to pure metal in the course of its movement through the heated exchange compartment. On the other hand, air or oxygen may be introduced to oxidize material. Thus the furnace may be employed to oxidize iron sulphide to produce ferric oxide.

A further modification of the invention is illustrated by Fig. 13, which shows how the lower combustion compartment 20b of a furnace such as shown in Fig. 9 may be provided with a vertically elongated receptacle or hopper 160 to receive the finely processed material from the lowermost disc-shaped hearth member 56. It is contemplated that combustion in the combustion compartment will be completed below the level of the top edge of the receptacle 160 so that the material in process will not be exposed to oxygen. The receptacle 160 which is made of suitable refractory material, such as a ceramic material or zircon, to withstand the high temperatures involved is provided with a ribbed roller 162 which discharges increments of the processed material but nevertheless hold back a sufficient accumulation of the material to provide a seal. Preferably a tube 164 is connected to the receptacle 160 for the continuous introduction of a desirable gaseous fluid. For example, a stream of $CO_2H_2$ or He may be introduced into the receptacle in this manner to flow upward through the receptacle and thus insure an oxygen-free atmosphere for the processed material. It is apparent that this third embodiment of the invention may be utilized for a retorting operation to produce sponge iron from ferric oxide. It is merely necessary to keep the reduced iron out of contact with oxygen until the metal cools to approximately 180° F. The stream of a non-reactive gas introduced into the receptacle 160 provides this protection and other expedients may provide the same protection below the ribbed roller 162.

My description in specific detail of selected embodiments of the invention, by way of example and to illustrate the principles involved will suggest various changes, substitutions, and other departures from my disclosure that properly lie within the spirit and scope of the appended claims.

I claim:

1. In a high temperature furnace for processing divided material, the combination of: wall means forming an upright furnace chamber; a plurality of hearths at successive levels in said chamber, the successive hearths being staggered with each hearth having a discharge edge overhanging an area of the hearth at the next lower level; means to feed the divided material to said plurality of hearths; a corresponding plurality of scrapers to displace material on each hearth to the discharge edge thereof to fall on said area of the next lower hearth; means to heat the interior of said chamber to cause gaseous fluid to flow upward in tortuous paths contiguous to said hearths; a first support structure carrying said plurality of hearths to form therewith a hearth assembly; and a second support structure carrying said plurality of scrapers to form therewith a scraper assembly, each of said support structures being suspended from above in said chamber and extending downward inside the chamber whereby both support structures elongate downward in response to rising temperature, each of said scrapers having a range of movement from an upper cold position to a lower hot position in accord with both the coefficient of thermal expansion of said second support structure and the distance of the scraper from the effective suspension level of the second support structure, said hearths being at positions on said first support structures to place their respective hot positions adjacent the lower ends of the ranges of thermal movement of the scrapers to avoid interfering with the thermal expansion movements of the scrapers and to position the hearths close to the scrapers at the hot positions of the hearths and scrapers, said hearth assembly being free for vertical movement relative to the chamber walls to permit elongation and expansion of the hearth assembly.

2. A combination as set forth in claim 1 in which each of said support structures has substantially the same coefficient of thermal expansion.

3. A combination as set forth in claim 1 in which the ranges of thermal movements of said scrapers are greater than the ranges of thermal movements of the corresponding hearths.

4. A combination as set forth in claim 1 in which said second support structure is longer than said first support structure and is supported from a higher level than the first support structure, whereby said scrapers move downward relative to the corresponding hearths in response to rising temperature, said scrapers being spaced sufficiently above the corresponding hearths when the furnace is cold to allow for said relative movement and thus prevent the scrapers from binding against the hearths at the maximum operating temperature of the furnace.

5. A combination as set forth in claim 4 in which both of said support structures have substantially the same coefficient of thermal expansion.

6. A combination as set forth in claim 1 in which said second support structure is longer than said first support structure and is suspended from a higher level; and which includes substantially vertical means under compression to raise said higher level in response to thermal expansion of the compression means, thereby to compensate at least in part for the difference in lengths and suspension levels of the two support structures in the thermal expansions of the two structures.

7. A combination as set forth in claim 1 in which said second support structure is longer than said first support structure and is suspended from a higher level, with both support structures having substantially the same coefficient of thermal expansion; and which includes means having substantially the same coefficient of thermal expansion and equal in length to substantially the difference between the two support structures, said last means acting under compression to carry the weight of said second support structure at its suspension level whereby thermal expansion of said compression means substantially compensates for the difference in length of the two support structures to equalize the ranges of thermal movement of the scrapers and the corresponding hearths.

8. In a high temperature furnace for processing divided material, the combination of: wall means forming an upright furnace chamber; a plurality of hearths at successive levels in said chamber, the successive hearths being staggered with each hearth having a discharge edge overhanging an area of the hearth at the next lower level; means to feed the divided material to said plurality of hearths; a corresponding plurality of scrapers to displace material on each hearth to the discharge edge thereof to fall on said area of the next lower hearth; means to heat the interior of said chamber to cause gaseous fluid to flow upward in tortuous paths contiguous to said hearths; a first support structure carrying said plurality of hearths to form therewith a hearth assembly; and a second support structure carrying said plurality of scrapers to form therewith a scraper assembly, each of said support structures being suspended from above in said chamber and extending downward inside the chamber whereby both support structures elongate downward in response to rising temperature, said hearth assembly being free for vertical movement relative to the chamber walls to permit elongation and expansion of the hearth assembly, said chamber walls surrounding said hearth assembly being at close spacing thereto to confine movement of the hearth assembly to substantially vertical movement.

9. A combination as set forth in claim 8 in which said second support structure comprises a vertical shaft and said hearth assembly confines said shaft against lateral movement.

10. A combination as set forth in claim 8 in which said wall means forming the furnace chamber has vertical guide surfaces and portions of said hearth assembly slidingly engage said guide surfaces to keep the hearth assembly from twisting in the chamber.

11. In a high temperature furnace for processing divided material, the combination of: wall means forming an upright furnace chamber; a plurality of hearths at successive levels in said chamber, said hearths including annular hearth members with inner circumferential discharge edges and alternate disc hearth members with outer circumferential discharge edges, the diameter of said disc members being of magnitudes intermediate the inner and outer diameters of said annular members; means to feed the divided material to said plurality of hearths; a corresponding plurality of rotary scrapers to displace material on each of said hearths to the discharge edge thereof to fall on the next lower hearth; a support structure carrying said plurality of hearths to form therewith a hearth assembly; an actuated shaft carrying said plurality of scrapers to form therewith a scraper assembly, both said shaft and said support structure being suspended from above in said chamber whereby both the shaft and the support structure elongate downward in response to rising temperature.

12. A combination as set forth in claim 11 in which each of said disc members is suspended from the annular members at the next higher level.

13. A combination as set forth in claim 12 in which said support structure includes circumferentially spaced tension members connected to the outer marginal portion of said annular hearth members.

14. A combination as set forth in claim 11 in which said chamber surrounds said hearth assembly at close spacing therefrom to confine the movement of the hearth assembly.

15. A combination as set forth in claim 14 in which each of said disc members rotatably confines said shaft to maintain substantially vertical alignment of the shaft.

16. A combination as set forth in claim 15 in which said wall means forming the chamber has vertical guide surfaces and portions of said hearth assembly slidingly engage said guide surfaces to keep the hearth assembly from twisting in the chamber.

17. A combination as set forth in claim 11 which includes rotary leveling members corresponding to at least some of said scrapers, said leveling members being carried by said shaft at greater spacing from the corresponding hearths than the scrapers to level off the deposited material on the hearths in advance of the leading faces of the scrapers.

18. A combination as set forth in claim 1 which includes means to introduce a fluid into said chamber at points adjacent at least some of said hearths.

References Cited in the file of this patent

UNITED STATES PATENTS

| | | |
|---|---|---|
| 1,817,043 | Stout et al. | Aug. 4, 1931 |

FOREIGN PATENTS

| | | |
|---|---|---|
| 111,580 | Great Britain | Dec. 6, 1917 |